US005138026A

United States Patent [19]

Miyasaka et al.

[11] Patent Number: 5,138,026

[45] Date of Patent: Aug. 11, 1992

[54] POLYPEPTIDE THIN FILM

[75] Inventors: Tsutomu Miyasaka; Mitsunori Ono; Naoyuki Nishikawa, all of Kanagawa, Japan

[73] Assignee: Fuji Photo Film Co., Ltd., Kanagawa, Japan

[21] Appl. No.: 480,699

[22] Filed: Feb. 15, 1990

[30] Foreign Application Priority Data

| | | | |
|---|---|---|---|
| Feb. 15, 1989 | [JP] | Japan | 1-35870 |
| Jun. 2, 1989 | [JP] | Japan | 1-140785 |

[51] Int. Cl.$^5$ .......... C08G 69/10

[52] U.S. Cl. .......... 528/328; 428/411.1; 428/474.4; 428/474.7

[58] Field of Search .......... 528/328; 428/411.1, 428/474.4, 474.7

[56] References Cited

U.S. PATENT DOCUMENTS

| | | | |
|---|---|---|---|
| 3,119,794 | 1/1964 | deVries et al. | 528/328 |
| 4,743,675 | 5/1988 | Watanabe | 528/328 |
| 4,857,427 | 8/1989 | Itoh et al. | 528/328 |

*Primary Examiner*—Harold D. Anderson

*Attorney, Agent, or Firm*—Sughrue, Mion, Zinn, Macpeak & Seas

[57] ABSTRACT

A polypeptide thin film obtained by polymerizing a monomolecular film comprising an amphiphilic compound having a hydrophobic moiety and a hydrophilic moiety having an amino acid ester structure per molecule, the conjugated acid of the elimination group of said ester having a pKa of not higher than 14, or a built-up film of said monomolecular film; and a process for preparing a material on which said polypeptide thin film is carried.

10 Claims, 7 Drawing Sheets

POLYPEPTIDE THIN FILM

FIELD OF THE INVENTION

This invention relates to a thin film comprising a molecular assembly and a process for preparing a material on which the same is carried. More particularly, this invention relates to a thin film which is composed of a polymer of an optical active amino acid having peptide bonds which has excellent in compatibility with organisms, and a process for preparing a material on which the same is carried.

BACKGROUND OF THE INVENTION

Molecular assemblies, such as a monomolecular film (monolayer) having a molecular arrangement or built-up film (monolayers=multilayer) formed by building up a plurality of the monomolecular films, are widely employed as materials for electronics devices, materials for surface protection, hyper-filtration membrances which utilize gaseous molecules or ion-permselectivity, functional thin films for sensors and permeability-controlling films for material delivery by utilizing the ultra-thinness and denseness thereof.

The Lamgmuir-Blodgett process (LB process) is generally known as a method for building up a monomolecular film of an amphiphilic molecule formed at the gas liquid interface on a substrate. The range of use of various LB films prepared by this method has been increased in recent years (see, Solid Physics 17 (12) 45 (1982)).

The molecular assemblies comprising an LB film exhibit various functions due to the molecular orientation and ultra-thinness. However, they have disadvantages in that they are physically delicate and the film structure is liable to be broken, or they have many structural defects depending upon the compounds employed and a high density can not be obtained.

In order to solve the problem of providing a film which has a uniform structure with an excellent packing of molecules, the film structure of the molecular assembly is required to be physically strengthened.

One of effective means for physically strengthening the film structure of the molecular assembly is crosslinking or polymerization.

With regard to the polymerization of molecular assemblies, such as an LB film and liposome, conventional polymerizable compounds employed and their polymerization are summarized in H. Bader et al., *Advances in Polymer Science*, Vol. 64, page 1 (1985) and R. Büschl, et al., *Macromol. Chem. Suppl.*, Vol. 6, page 245 (1984).

The study of polymerizable amphiphilic compounds had been active in the 1980's. Widely used methods employ unsaturated compounds such as vinyl, diene and diacetylene compounds. The unsaturated bonds are cleaved by ultraviolet light (UV) or a radiation, such as gamma rays, so as to carry out polymerization. However, these methods have difficulty in keeping the order of molecular arrangement by distortion due to polymerization after the cleavage of the unsaturated bonds, though fast polymers can be obtained.

The orientation of the film is greatly influenced by the lengths of the alkyl chains and the type of the terminal hydrophilic group, as pointed out in A. Laschewsky and H. Ringsdorb, *Mactomolecule,* Vol. 21, page 1936 (1988). Hence, compounds providing a polymerized film having good orderliness are limited to a small number of compounds.

There is disclosed in A. Laschewsky, *J, Am. Chem. Soc.*, Vol. 109, page 788 (1987) that in the amphiphilic compounds having various unsaturated bonds useful for radiation polymerization, the polymeric groups are carried through spacer groups so as to maintain order.

JP-A-57-159506 (the term "JP-A" as used herein means an "unexamined published Japanese patent application") discloses that the polymer films of the monomolecular films of unsaturated compounds (surfactants) and built-up films thereof, prepared by radiation polymerization are used as hyper-filtration films.

Conventional methods for polymerizing these compounds having unsaturated bonds by radiation have the following problems. First, turbulence in the arrangement structure or the disordered agglomeration or precipitation of molecules is liable to be caused by polymerization. Hence, the specific molecular design, for example, the introduction of spacer groups into molecules must be made to prevent such a problem arising. Second, irradiation with ultraviolet light or gamma rays poses a problem in that additives often coexisting with polymerizable amphiphilic molecules are decomposed or denatured. Third, films prepared by such a polymerization have very poor compatibility with organisms and their applications to the tissues of organisms as permeability-controlling films for medicines are limited.

Methods for forming a disulfide bond by the oxidative polymerization of dithiols are proposed in *J. Am. Chem. Soc.*, Vol. 109, page 4419 (1987) as polymerization methods which do not require radiation. Further, methods for radical polymerizing the above-described compounds having unsaturated bonds in the presence of initiators are also useful.

In these methods, however, the initiators must be used during polymerization. Hence, there must be required a stage for removing the initiators from the film-forming system after the completion of polymerization. In addition, these methods have a problem in that co-existing materials are affected by the initiators, including oxidation-reduction agents.

To improve compatibility with organisms by improving polymerization forms, methods for self-condensation-polymerizing the molecular films of long-chain alkyl derivatives of amino acids are disclosed in *Macromol. Chem. Rapid Commun.*, Vol. 3, page 167 (1982) and *Thin Solid Films,* Vol. 133, page 39 (1985), and a method for condensation-polymerizing similar derivatives in the presence of carbodiimide as a condensing agent is disclosed in *J. Am. Chem. Soc.*, Vol. 108, page 487 (1986). However, the condensation reaction in the self-condensation polymerization of these methods proceeds very slowly, and the method using a condensing agent has a problem in that the condensing agent and by-products are left behind and the condensation reaction is hard to handle. This is because the efficiency of the condensation reaction must be controlled.

Methods for preparing monomolecular films by using optical active amino acids and ester derivatives thereof are described in *J. Am. Chem. Soc.*, Vol. 111, page 1115 (1989) and ibid., Vol. 111, page 1436 (1989). There is suggested that the molecular arrangement films of these optical active materials give excellent orientation and denseness. However, no method is disclosed therein for strengthening the structure thereof by rapidly self-polymerizing the films of these amino acid derivatives so as to prepare a thin film of an optically active polypeptide.

SUMMARY OF THE INVENTION

Accordingly, an object of the present invention is to provide a polymerizable thin film having a good molecular arrangement, which is polymerized without using any radiation and any polymerization initiator, and a process for preparing a material on which the same is carried.

Another object of the present invention is to provide a polymerizable thin film which allows polymerization to proceed spontaneously at a high speed and high yield by self-polymerization, and a process for preparing a material on which the same is carried.

Still another object of the present invention is to provide a polymeric thin film has excellent denseness, as well as compatibility with organisms.

The above objects of the present invention have been achieved by providing:

a polypeptide thin film obtained by polymerizing a monomolecular film (monolayer) comprising an amphiphilic (amphiphatic) compound (including an amphiphilic long-chain alkyl derivative of an optical active o-amino acid ester having a same stereo-structure) having a hydrophobic moiety and a hydrophilic moiety having an amino acid ester structure per molecule, the conjugated acid of the elimination group of said ester having a pKa of not higher than 14, preferably from 10 to 13, or a built-up film (multilayer) of said monomolecular film; and a process for preparing a material on which said polypeptide thin film is carried, which comprises (A) forming a monomolecular film comprising an amphiphilic compound having a hydrophobic moiety and a hydrophilic moiety having an amino acid ester structure per molecule, the conjugated acid of the elimination group of said ester having a pKa of not higher than 14, at a gas-liquid interface, and either;

(B) polymerizing said monomolecular film at said interface and then transferring the resulting film onto a substrate, or (B') transferring the monomolecular film or a built-up film prepared from the monomolecular film onto a substrate and then carrying out polymerization.

BRIEF DESCRIPTION OF THE DRAWINGS

FIG. 6(*b*) is an electron micrograph (200 × magnification) of an LB film (monomolecular film) prepared by using compound II-6 of the present invention.

DETAILED DESCRIPTION OF THE INVENTION

Figure 1:
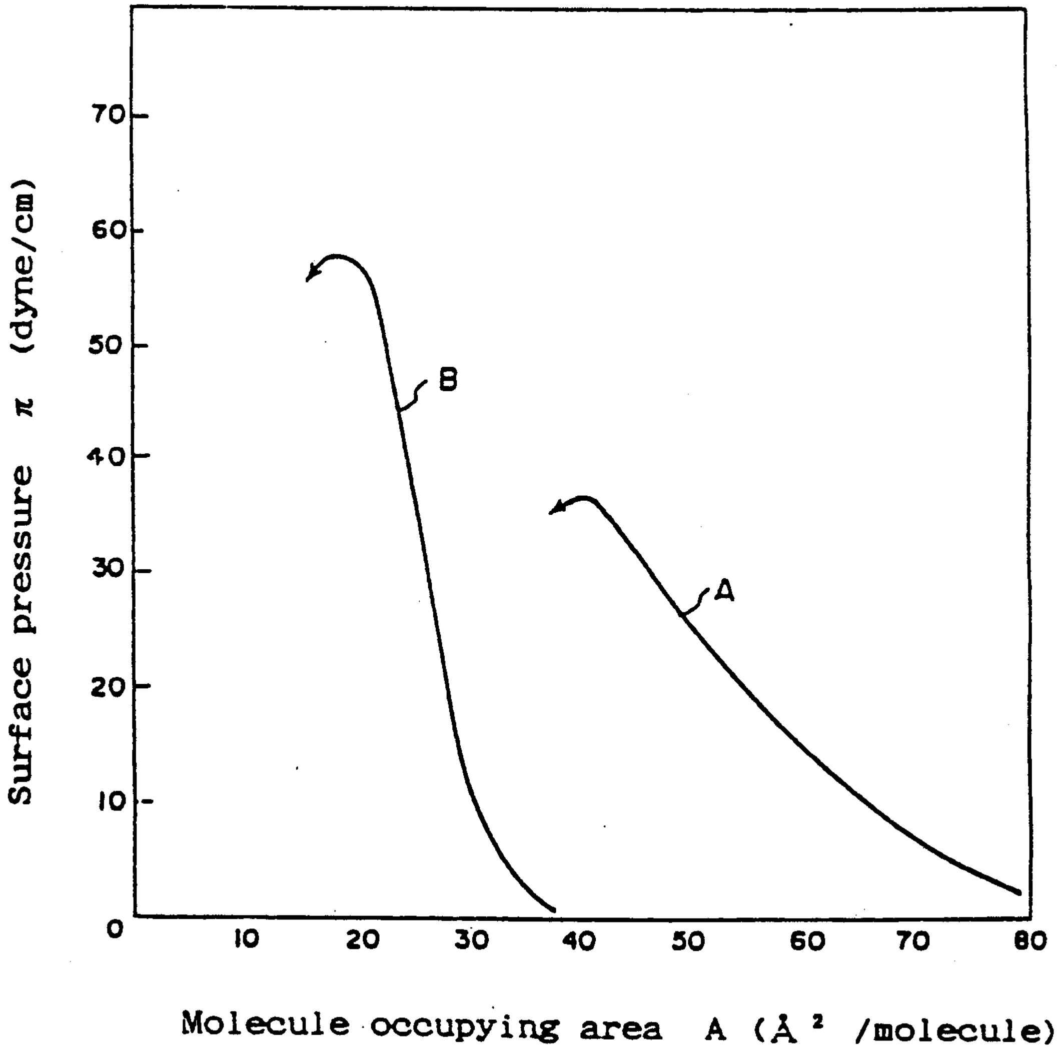
FIG. 1 is a graph illustrating isothermal characteristics at 20° C of a surface pressure-molecule occupying area (π-A), wherein A is a curve for the monomolecular film of the monomer of compound I-1 and B is a curve for monomolecular film after polymerization at room temperature for 2 hours.

The polymerized monomolecular film or built-up film of the present invention is an ultra-thin film carried on a substrate by various monomolecular film coating methods including the Langmuir-Blodgett process, and is characterized by the main chain of the polymer being composed of polypeptide, i.e., the chains of amide bonds of amino acids. In the polymerized film of the present invention, amphiphilic amino acid derivatives having a reactive ester group, i.e., electrophilic ester group are subjected to condensation polymerization by the following reaction to form the skeleton of amide bond.

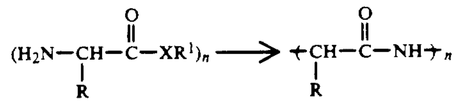

wherein n represents an integer of 2 or greater, and R, $R^1$ and X are illustrated in the definitions of general formula (I) or (II) hereinafter.

Now, methods for forming the polymerized film of the present invention will be illustrated below.

Any of two of a method comprising carrying out polymerization at the gas-liquid interface and a method comprising carrying out polymerization on a substrate can be used to form the polymerized thin film.

To carry out polymerization at the gas-liquid interface, a monomolecular film of an amphiphilic amino acid ester derivative monomer of the following formula (I) or (II) according to the present invention is prepared by spreading said monomer on a subphase in a trough for the production of monomolecular film with an appropriate solvent. Said film is left to stand on the water surface for a period of time required for polymerization, preferably for 30 minutes to 2 hours. Pure water or a salt solution, such as a buffer solution can be used for the subphase. Preferably, the pH thereof is adjusted to a range of 5 to 9 depending on the equilibrium constant of the ester decomposition of the monomer to be used.

The temperature of the subphase is preferably in the range of from room temperature to 60° C., more preferably from 20° C. to 45° C. When the temperature is high, the reaction can be accelerated.

The surface pressure during the reaction is kept in the range of preferably 5 to 40 dyne/cm, more preferably 10 to 25 dyne/cm. Generally, the surface pressure is controlled to a given value. If desired, the surface pressure may be increased or reduced as the reaction proceeds. After the completion of the reaction, the polymerized film on the water surface is transferred onto a hydrophilic or hydrophobic substrate by means of Langmuir-Blodgett process (vertical dipping method) or horizontal dipping method. When one layer of said film is transferred onto the substrate, a polymerized monomolecular film is formed thereon. When many layers of said film are transferred onto the substrate one by one, a polymerized built-up film is formed thereon.

The second method is a method wherein a monomolecular film of an amphiphilic amino acid ester derivative monomer of the following formula (I) or (II) is formed on a water surface and transferred onto a substrate in the manner described above and then the resulting built-up film is left to stand on the substrate to thereby allow polymerization to proceed. When the monomolecular film is to be built up on the substrate in this method prior to the reaction, it is necessary that the subphase is kept under such conditions that the polymerization reaction is inhibited, for example, the subphase is kept at a low pH of not high as 30° C. The monomer built up on the substrate can be polymerized by treating it under polymerization accelerating conditions, for example, by heating it, treating it with alkaline gas (e.g., $NH_3$) or immersing it in an aqueous alkaline solution.

Of these two polymerization methods, the former gas-liquid interfacial polymerization is preferred from the viewpoint of the permission of reaction. However, the method is not always preferred from the viewpoint of reaction efficiency and the degree of polymerization. They can be properly used depending on the stability of the monomers to be used.

Amphiphilic amino acid esters which are used in the present inventioncan be represented by the following general formula (I) or (II). Particularly, amphiphilic optical active amino acid esters are represented by the following general formula (II).

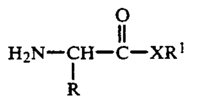
(I)

In formula (I), R represents an organic group including a long-chain alkyl group (preferably a straight-chain alkyl group having from 12 to 20 carbon atoms, more preferably from 16 to 20 carbon atoms); $XR^1$ is an elimination group whose conjugated acid has a pKa of not higher than 14; X represents —O—, —S—, or —N($R^2$)— (wherein $R^2$ is hydrogen atom, an alkyl group or an aryl group, and $R^2$ may be combined together with $R^1$ to form a ring which may optionally have hetero-atom such as nitrogen or unsaturated bond). Preferably, X is —O—. Examples of $R^1$ include an aryl group (including a substituted aryl group; examples of the aryl group including phenyl and naphthyl; examples of substituent groups including nitro group and halogen), a halo alkyl group (e.g., monochloromethyl, dichloromethyl, trichloromethyl), an acylamino group (e.g., N-methylacetylamino, N-methylbenzoylamino), —N═$CR^3(R^4)$ (wherein $R^3$ and $R^4$ are each hydrogen atom, an alkyl group or an aryl group, and the alkyl group and the aryl group may be substituted), an alkenyl group and an alkinyl group. Among these groups, the aryl group(including the substituted aryl group) is preferred.

Preferred straight-chain alkyl groups of R are those having from 16 to 20 carbon atoms. When said alkyl group is bonded to a residue of an amino acid through a bonding group, said bonding group is preferably —NHCO—, —NHCOO—, —NHCONH—, —NHCO—S—, —0—, —S—, COO—, —$OPO_3^{\ominus}$ or a combination of these groups with said alkyl group.

Preferred examples of the amino acid ester (monomers) represented by formula (I), which can be used in the present invention include, but are not limited to, the following compounds.

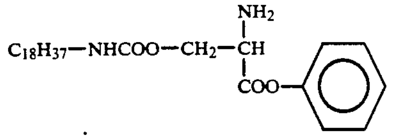
I-1

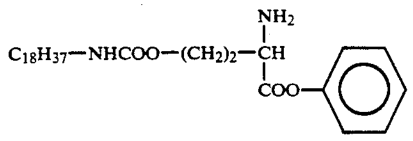
I-2

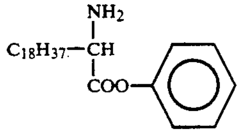
I-3

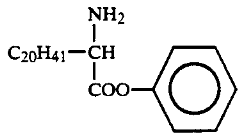
I-4

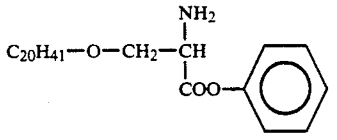
I-5

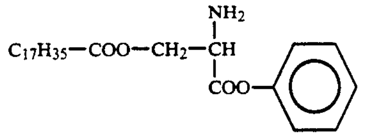
I-6

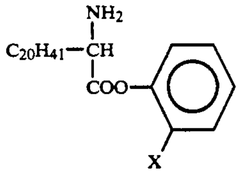
I-7

X = Cl, Br, I or F

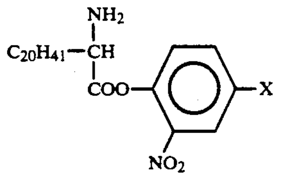
I-8

X = Cl, Br, I or F

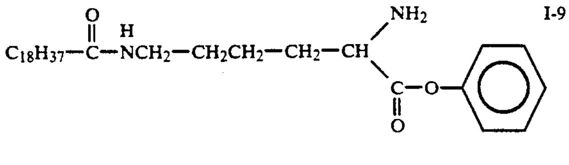
I-9

-continued

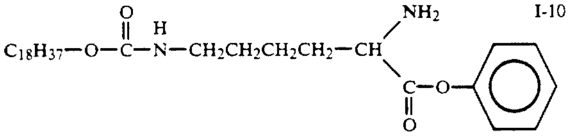
I-10

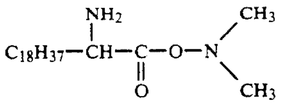
I-11

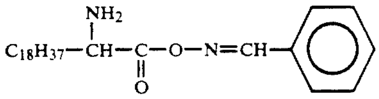
I-12

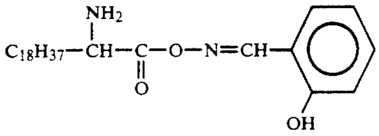
I-13

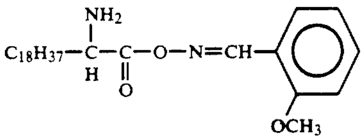
I-14

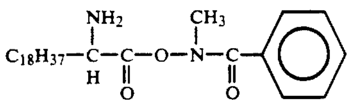
I-15

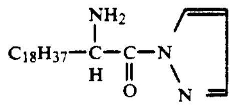
I-16

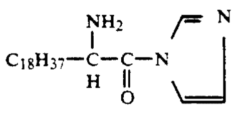
I-17

-continued

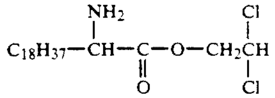
I-18

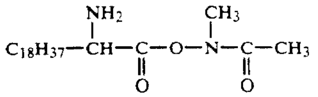
I-19

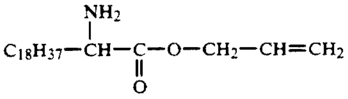
I-20

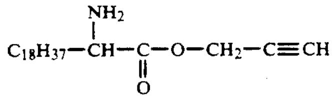
I-21

The amino acid esters of formula (I) can be synthesized through the following synthesis route.

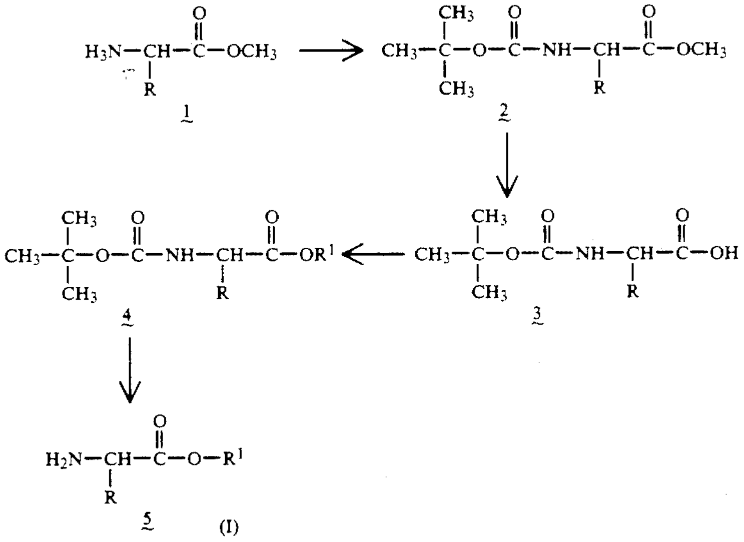

The following synthesis example illustrates the synthesis of the compound where R=$C_{18}H_{37}$(n)

Compound 1' (compound 1 where R=$C_{18}H_{37}$(n)) was synthesized according to the method described in T. Folda, L. Gros, H. Ringodorf, Makromol. Chem. Rapid Commun., Vol. 3, page 167 (1982). M.P. of compound 1'; 94° to 98° C. IR spectrum (Nujol): 1760 $cm^{-1}$ (ester carbonyl), 3200 $cm^{-1}$, 1640 $cm^{-1}$, 1550 $cm^{-1}$ (ammonium salt).

35 g (0.093 mol) of compound 1' was dissolved in 200 ml of tetrahydrofuran. 21 g (0.19 mol) of $Et_3N$ was added thereto and the mixture was stirred at room temperature for 10 minutes.

243 g (0.14 mol) of di-tert-butyl carbonate (a product of Tokyo Kaseihin) was added thereto and the mixture as such was stirred at room temperature for 10 hours. After completion of the reaction, tetrahydrofuran was distilled off under reduced pressure. Extraction was carried out by adding 200 ml of ethyl acetate and 200 ml of water. This operation was repeated twice. The resulting organic layer was washed with a saturated NaCl solution once and dried over $Na_2SO_4$. The organic solvent was distilled off under reduced pressure to give a white crystal. The crystal was recrystallized from ethanol/hexane to obtain 41 g of compound 2' (compound 2 where $R=C_{18}H_{37}$(n)).

m.p. 85° to 88° C.

IR 3350 $cm^{-1}$ (NH)
(Nujol)
1760 $cm^{-1}$ (ester)
1720 $cm^{-1}$ (urethane)

10 g (0.024 mol) of compound 2' was dissolved in 200 ml of a mixed solution of tetrahydrofuran $CH_3OH=2:1$. 10 ml of an aqueous solution of 2 g (0.05 mol) of sodium hydroxide was added dropwise thereto. The mixture was stirred at room temperature for 12 hours and acidified to pH=about 4 with dilute hydrochloric acid while cooling it in an ice bath. 200 ml of water was added thereto. Extraction with 100 ml of ethyl acetate was conducted three times. The resulting organic layer was washed with water and dried over $Na_2SO_4$. The organic solvents were distilled off under reduced pressure to give a crystal. The crystal was recrystallized from ethyl acetate/hexane to obtain 7.2 g of compound 3' [compound 3 where $R=C_{18}H_{37}$(n)].

m.p. 121° to 124° C.

IR 3400 $cm^{-1}$ (NH)
(Nujol)
2800 to 2600 $cm^{-1}$ (OH of carboxylic acid)
1720 $cm^{-1}$ (carbonyl of carboxylic acid)
1700 $cm^{-1}$ (urethane)

Active esters having a long-chain alkyl group described above can be prepared by using various alcohols and dicyclohexylcarbodiimide as a condensing agent.

The following preparation is provided to illustrate the case where phenol is used as a typical example.

1.8 g (0.0042 mol) of compound 3' and 0.4 g (0.0043 mol) of phenol were dissolved in 100 ml of ethyl acetate. 0.95 g (0.0046 mol) of dicyclohexylcarbodiimide (a product of Tokyo Kaseihin) was added thereto. The mixture as such was stirred at room temperature for 12 hours and cooled with an ice bath. The resulting precipitates were removed by filtration. The mother liquor was concentrated and the residue was purified by means of silica gel column chromatography, eluting with hexane : ethyl acetate =8:1 as an eluent to give 1.7 g of compound 4a (compound 4 where $R=C_{18}H_{37}$(n), R' = 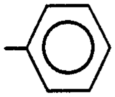).

m.p. 125° to 129° C.

IR 3360 $cm^{-1}$ (NH)
(Nujol)
1780 $cm^{-1}$ (ester)
1695 $cm^{-1}$ (urethane)
1600 cm−(substituted benzene)

1 g of the compound 4a was dissolved in 10 ml of anhydrous chloroform, and the resulting solution was cooled in an ice bath to 0° C. 5 ml of $CF_3CO_2H$ was added thereto and the mixture was stirred at 0° C. for 30 minutes. The solvent was distilled off under reduced pressure. The resulting white crystal was again dissolved in 20 ml of chloroform, and the chloroform layer was washed with 10 ml of a 5% aqueous solution of $NaHCO_3$ twice. The chloroform layer was then washed with water and dried over $Na_2SO_4$. The solvent was distilled off under reduced pressure while using an ice bath to obtain 0.7 g of the desired compound I-3 as a white crystal.

Figure 4:
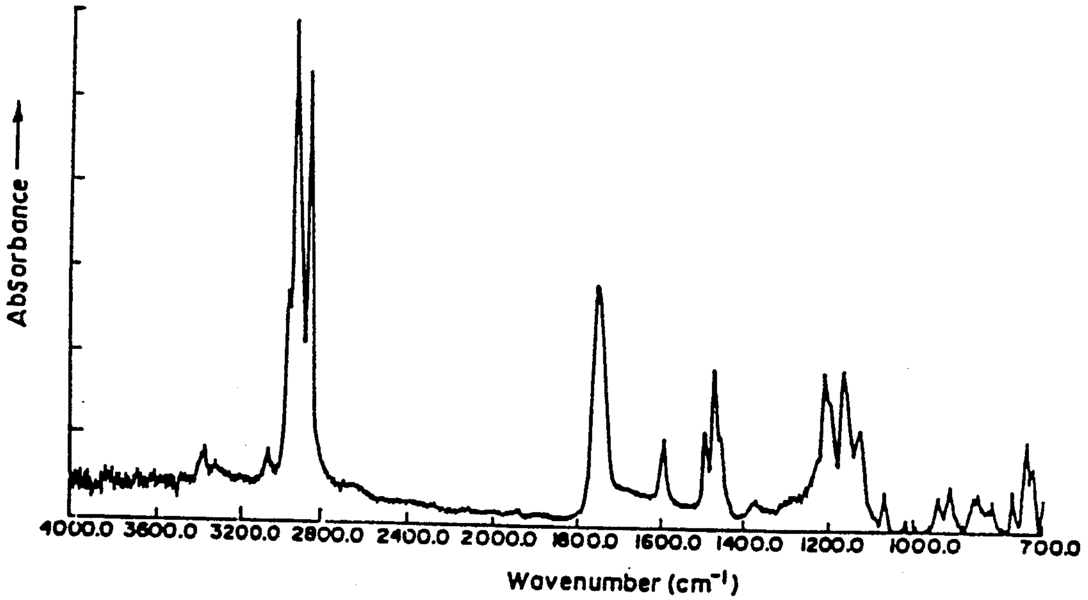
FIG. 4 is a chart showing infrared absorption spectrums of compound I-3.

The compound was decomposed on standing at room temperature. Therefore, the compound was fed to a film preparing stage without purification after the structure was confirmed by IR spectrums (FIG. 4).

In a similar manner to that described above, other compounds were prepared. The compounds were unstable and hence the melting points of their intermediates 4b to 4e to were measured.

| Compound | Intermediate | R | $R^1$ | M.P. |
|---|---|---|---|---|
| I-18 | 4b | $C_{18}H_{37}$(n) | 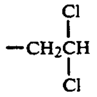 | 102 to 103° C. |
| I-19 | 4c | " | 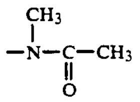 | 99 to 101° C. |
| I-20 | 4d | " | $-CH_2-CH=CH_2$ | 95 to 100° C. |
| I-21 | 4e | " | $-CH_2-C\equiv CH$ | 88 to 89° C. |

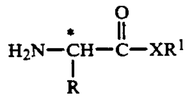

(II)

In formula (II), R represents an organic group including a long-chain alkyl group (preferably a long-chain alkyl group having from 12 to 20 carbon atoms, more preferably from 16 to 20 carbon atoms); $XR^1$ represents an elimination group whose conjugated acid has a pKa of not higher than 14; and X represents —O—, —S—, or $—N(R^2)—$ (wherein $R^2$ is hydrogen atom, and alkyl group or an aryl group and $R^2$ may be combined together with $R^1$ to form a ring which may optionally have heteroatom such as nitrogen or unsaturated bond). Preferably, X is —O—. Examples of $R^1$ include an aryl group (including a substituted aryl group; examples of the aryl group including phenyl group and naphthyl group; and examples of substituent groups including nitro group and halogen), an alkyl group (including a substituted alkyl group; e.g., methyl, monochloromethyl, dichloromethyl, trichloromethyl), an acylamino group (e.g., N-methylacetylamino, N-methylbenzoylamino), $—N=CR^3(R^4)$ (wherein $R^3$ and $R^4$ are each hydrogen atom, an alkyl group or an aryl group, and the alkyl group and the aryl group may be substituted), an alkenyl group (e.g., allyl) and an alkinyl group (e.g., acetyl). Among these groups, the alkyl group, the alkinyl group and the aryl group are preferred.

Preferred long-chain alkyl groups of R include those having from 16 to 20 carbon atoms. When said alkyl group is bonded to a residue of an amino acid through a bonding group, said bonding group is preferably —NHCO , —NHCOO—, NHCONH—, —NHCO—S—, —O—, —S—, —COO—, $—OPO^{\oplus}{}_3—$ or a combination of these groups with an alkyl group or a substituted aryl group.

Preferred examples of the optical active amino acid esters (monomers) represented by formula (II) include, but are not limited to, the following compounds.
II-1
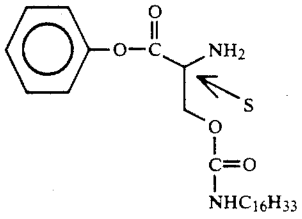
II-2
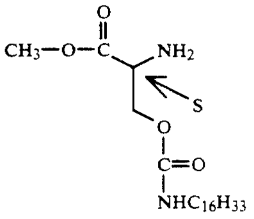
II-3
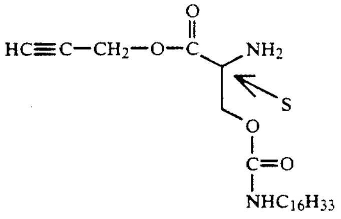
II-4
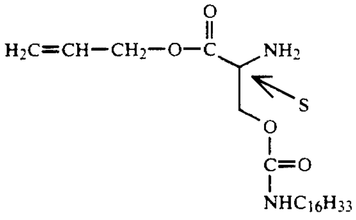
II-5
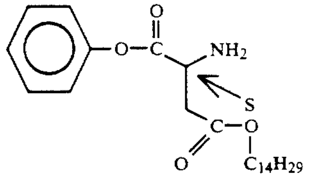
II-6
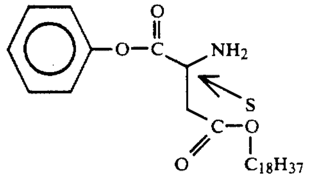
II-7
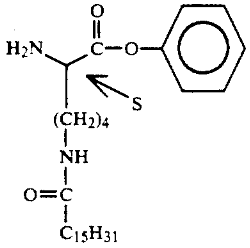
-continued
II-8
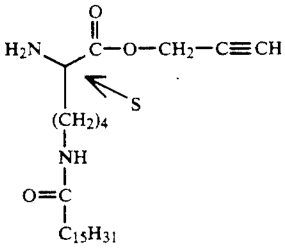
II-9
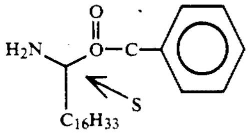
II-10
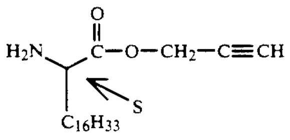
II-11
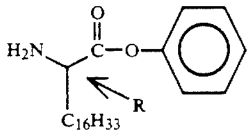
II-12
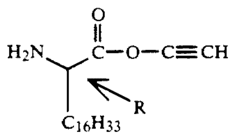
II-13
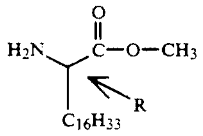
II-14
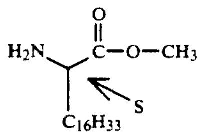
II-15
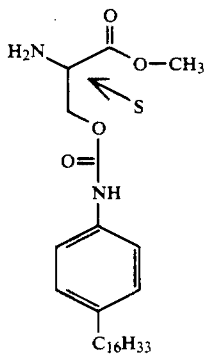

-continued

II-16

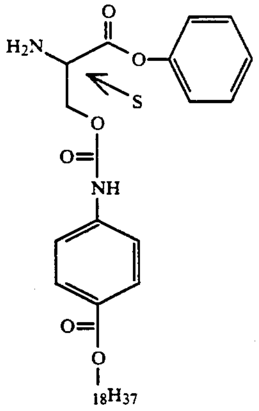

II-17

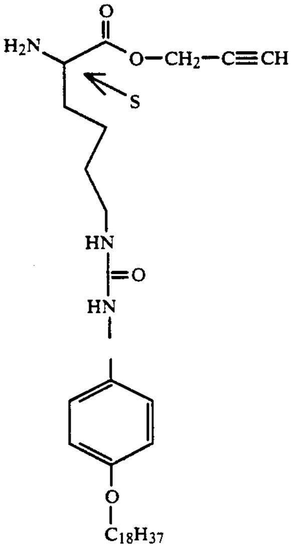

-continued

II-18

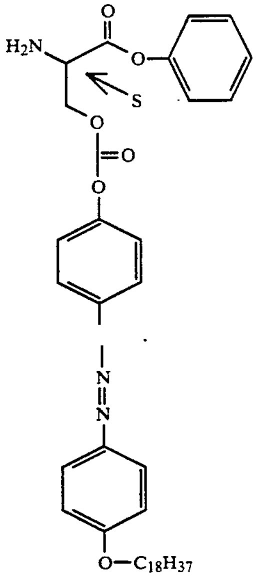

II-19

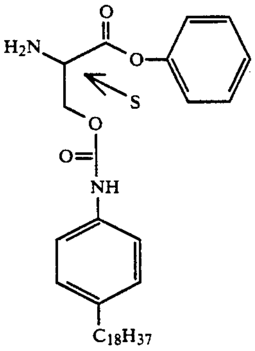

Methods for synthesizing the optical active amino acid esters of formula (II) according to the present invention are roughly classified into the following two.

One of them is a method wherein optical active amino acids are used as starting materials and they are converted into the desired compounds while retaining chirality. The other is a method wherein the synthesis of racemes are allowed to proceed and optical active compounds are obtained by using resolving reagents such as brucine.

Typical examples of the methods include, but are not limited to, the following synthesis methods.

Synthesis of compound II-1

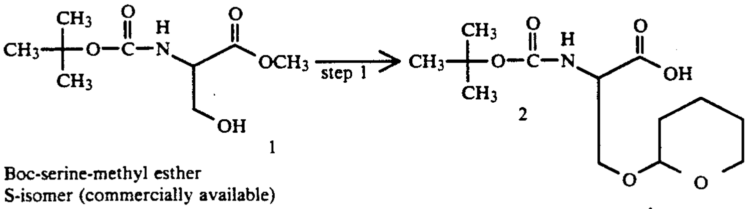

Boc-serine-methyl esther
S-isomer (commercially available)

-continued

Synthesis of compound II-1

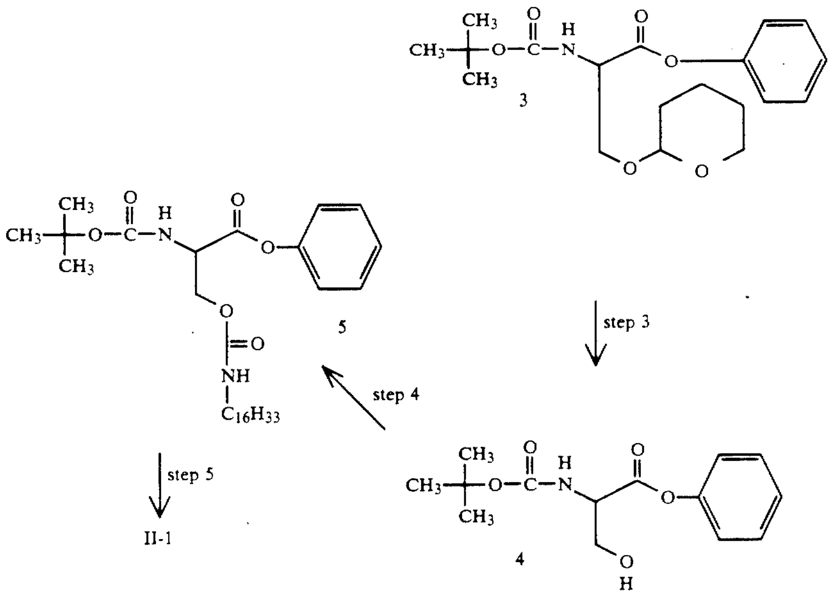

Step 1

A solution of 200 mg (110 mmol) of p-toluenesulfonic acid (PTS) in 2 ml of tetrahydrofuran (THF) was added dropwise to a mixed solution of 21 g (96 mmol) of Boc-l-serine methyl ester 1, 40 g (480 mmol) of 2,3-dihydropyran (DHP) and 450 ml of CHC13. The mixture was stirred for 3 hours. After DHP and $CHCl_3$ were distilled off under reduced pressure, 200 ml of $CHCl_3$ was added to the residue. Washing with an aqueous 5% $NaHCO_3$ solution, water washing and drying over $Na_2SO_4$ were carried out, and $CHCl_3$ was distilled off under reduced pressure. The thus-obtained solid was dissolved in 500 ml of MeOH. A solution of 4.5 g (100 mmol) of 93% NaOH in 80 ml of $H_2O$ was added thereto and the mixture was left to stand overnight. After the solvents were distilled off, water was added to the residue. The water layer was washed with AcOEt, and 200 ml of AcOEt was added thereto. The water layer was acidified (pH=about 3) with dilute HCl. Extraction with AcOEt, water washing and drying over $Na_2SO_4$ were carried out. AcOEt was distilled off under reduced pressure to obtain 21 g (73 mmol) of carboxylic acid 2 as a high-viscosity liquid.

Step 2

A mixed solution of 2.80 g (9.7 mmol) of carboxylic acid 2, 1.57 g (9.7 mmol) of carbonyldiimidazole and 70 ml of THF was stirred for one hour. A solution of 0.91 g (9.7 mmol) of phenol in 30 ml of THF was added thereto. The mixture was stirred at room temperature for one hour, then under reflux for 1.5 hours and left to stand overnight. The solvent was distilled off under reduced pressure. 200 ml of AcOEt was added to the residue. Water washing was conducted three times, and then drying over $Na_2SO_4$ and distillation under reduced pressure were carried out. The residue was purified by means of silica gel column chromatography (eluting with hexane/AcOEt=9/1) to obtain 1.37 g (3.8 mmol) of the phenyl ester 3 as a colorless solid. Yield: 39%.

The structure of compound 3 was confirmed by IR, $^1$H-NMR and MASS.

IR (KBr}3300 $cm^{-1}$, 1780 $cm^{-1}$, 1700 $cm^{-1}$, 1230 $cm^{-1}$

Step 3

950 mg (5 mmol) of PTS was added to a mixed solution of 5.5 g (15 mmol) of phenyl ester 3, 200 ml of MeOH and 20 ml of $H_2O$. The mixture was stirred for 2 hours at room temperature.

950 mg (5 mmol) of PTS was then added thereto and the mixture was stirred for 2 hours. The solvents were distilled off under reduced pressure. The residue was purified by means of silica gel column chromatography, eluting with hexane/AcOEt=7/3 to obtain 1.2 g (4.2 mmol) of compound 4 (Yield : 28%).

The structure of compound 4 was confirmed by IR, $^1$H-NMR and MASS.

Compound 4 was decomposed when a $CHCl_3$ solution of compound 4 was washed with an aqueous $NaHCO_3$ solution.

IR (KBr) 3500 $cm^{-1}$, 3240 $cm^{-1}$, 1780 $cm^{-1}$, 1700 $cm^{-1}$

Step 4

1.2 g (6.0 mmol) of trichloromethyl chloroformate (TCF) was added dropwise to 300 mg of activated carbon. Then, phosgene gas generated, was blown into 50 ml of $CH_2Cl_2$ while cooling them with ice. A mixture of 1.18 g (4.2 mmol) of Boc-l-serine phenyl ester 4, 0.42 g (4.2 mmol) of Et3N and 25 ml of $CH_2Cl_2$ was dropwise added thereto for a period of 30 minutes while cooling them with ice. After the mixture was stirred for 3 hours, $N_2$ was blown into the mixture to expel phosgene. A mixture solution of 1.14 g (4.2 mmol) of stearylamine, 0.42 g (4.2 mmol) of $Et_3N$ and 50 ml of $CH_2Cl_2$ was added thereto. After the mixture was left to stand overnight, the organic layer was washed with water and dried over $Na_2SO_4$. Evaporation under reduced pressure was carried out, and the residue was chromatographed on a column of silica gel, eluting with hexane/AcOEt=8/2 to obtain 1.18 g of a fraction containing compound 5. A portion of this (400 mg) was recrystallized from AcOEt to give 0.32 g (0.56 mmol) of compound 5.

The structure of compound 5 was confirmed by IR, $^1H$-NMR and MASS.

Compound 5 was partially decomposed on the silica gel chromatograph

IR (KBr) 3250 $cm^{-1}$, 1780 $cm^{-1}$, 1750 $cm^{-1}$, 1695 $cm^{-1}$

Step 5

200 mg (0.35 mmol) of compound 5 was dissolved in a mixed solution of 4 ml of trifluoroacetic acid (TFA) and 4 ml of $CH_2Cl_2$. The mixture was stirred for 30 minutes. The solvents was distilled off under reduced pressure. Further, $CH_2Cl_2$ was added and evaporated under reduced pressure. This operation was repeated twice. The residue was dried in vacuo to obtain quantitatively compound II-1. 100 mg (0.17 mmol) thereof was dissolved in $CHCl_3$ and treated with a cold aqueous solution of $NaHCO_3$ The organic layer was dried over $Na_2SO_4$ and distillation under reduced pressure was carried out. There was obtained 60 mg (0.13 mmol) of the desired lipid II-1.

The structure of compound II-1 was confirmed by IR, $^1H$-NMR and MASS.

$[\alpha]_D^{24} = +6.0$ (C=1.0, $CHCl_3$)

IR (KBr) 3500 $cm^{-1}$, 1765 $cm^{-1}$, 1695 $cm^{-1}$

Synthesis of compounds II-9 and II-11

Methods of optically resolving α-amino-stearic acids as starting materials with brucine are described in the following two literature and were carried out by referring thereto.

1. A. K. Mills, A. E. Wilder Smith, Helv. Chim. Acta, Vol. 43, page 1915 (1960)

2. E. M. Landan, S. Grayer Wolf, L. Leiserowitz, M. Lahaw. J. Sagiv. J. Am. Chem. Soc., Vol. 111, page 1436 (1989)

Synthesis route

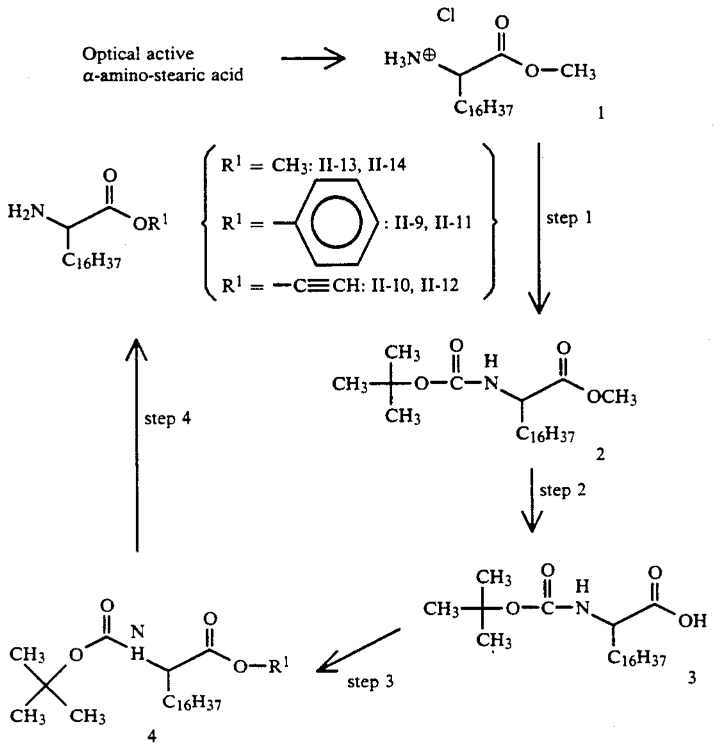

Step 1

49.4 g (0.14 mol) of compound 1 was dissolved in 300 ml of methanol. 14.1 g (0.14 mol) of triethylamine was added thereto and the mixture was stirred at room temperature.

24.3 g (0.14 mol) of di tert-butyl carbonate (a product of Tokyo Kaseihin) was added thereto and the mixture as such was stirred at room temperature for 10 hours.

After the completion of the reaction, methanol was distilled off under reduced pressure. Extraction was carried out by adding 200 ml of ethyl acetate and 200 ml of water. This operation was repeated twice. The resulting organic layer was washed with saturated NaCl solution once and dried over $Na_2SO_4$.

The organic solvent was distilled off under reduced pressure to give a white crystal. The crystal was recrystallized from ethanol/hexane to give 41 g of the desired compound 2.

m. p. 85 to 88° C.

IR 3350 $cm^{-1}$ (NH)

(Nujob)

1760 $cm^{-1}$ (ester)

1720 $cm^{-1}$ (urethane)

step 2

10 mol) of compound 2 was dissolved in 200 ml of a mixed solution of tetrahydrofuran : $CH_3OH$=2:1, and 10 ml of an aqueous solution of 2 g (0.05 mol) of sodium hydroxide was added dropwise thereto.

The mixture was stirred at room temperature for 12 hours and then acidified to pH=about 4 with dilute hydrochloric acid while cooling it with an ice bath. 200 ml of water was added thereto. Extraction with 100 ml of ethyl acetate was carried out three times. The organic layer was washed with water and dried over $Na_2SO_4$.

The organic solvent was distilled off under reduced pressure to give a crystal. The crystal was recrystallized from ethyl acetate/hexane to obtain 7.2 g of the desired compound 3. m. p. 121 to 124° C.

IR 3400 $cm^{-1}$ (NH)
(Nujol)
2800 to 2600 $cm^{-1}$ (OH of carboxylic acid)
1720 $cm^{-1}$ (carbonyl Of carboxylic acid)
1700 $cm^{-1}$ (urethane)

step 3

20 g (0.05 mol) of compound 3 and 4.7 g (0.05 mol) of phenol were dissolved in ethyl acetate, and the mixture was stirred at 0° C.

10.3 g (0.05 mol) of DCC (dicyclohexylcarbodiimide) was added thereto, and the mixture was stirred at room temperature for 10 hours. The precipitate was removed by filtration, and the residue was purified by means of silica gel column chromatography (eluent hexane : ethyl acetate=4:1) to obtain 23 g of the desired compound 4 as a colorless oil ($R^1$ = 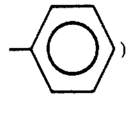 )

IR (neat) 3450 $cm^{-1}$, 1780 $cm^{-1}$, 1700 cm−

Step 4

10 g (0.02 mol) of compound 4 was dissolved in 100 ml of $CH_2Cl_2$, and the mixture was cooled to −10° C. 20 ml of trifluoroacetic acid was added thereto, and the mixture was stirred at 0° C. for 30 minutes.

After volatile matters were distilled off under reduced pressure, the residue was dissolved in ethyl acetate. The organic layer was washed with a 5% aqueous solution of $NaHCO_3$ three times and dried over $Na_2SO_4$ The solvent was distilled off under reduced pressure to give the desired compounds II-9 and II-11.

The compound was unstable. Hence, the compound was fed to a film-preparing stage without purification.

II-9$[\alpha]_D^{25}$+14° (C=0.5$CHCl_3$) (TFA salt)
: IR=3400 $cm^{-1}$, 1765 $cm^{-1}$
II-11:
$[\alpha]_D^{25}$+12° (C=0.5$CHCl_3$) (TFA salt)
: IR=3350 $cm^{-1}$, 1760 $cm^{-1}$ (KBr)

Other compounds represented by formula (II) can be prepared in a similar manner to that described above.

Various organic or inorganic materials having a hydrophilic or hydrophobic surface can be used as substrates (supports) to be coated with the monomolecular film or built-up film in the present invention. These materials may be flat, or may have porous or fibrous three-dimensional network structure.

Examples of the flat materials include electrically conductive materials such as metals, vitreous inorganic materials (e.g., glass, quarts), other inorganic insulating materials (e.g., alumina), various inorganic and organic crystals, inorganic semiconductors ($SnO_2$, $In_2O_3$, ZnO, $TiO_2$, $WO_3$, GaAs, Si), organic semiconductors, organic electrical conductors, organic polymers and composite materials thereof. The materials may be electrodes connected with external electric circuits or other components such as sensors (e.g., field effect transistor).

Porous or fibrous materials are useful as substrates when mainly used as permeable films or filters. Examples of the porous or fibrous materials include organic and inorganic microporous filters, cellulose resin films and various porous polymer films.

Examples of solvents for spreading the monomolecular film, which are used in the present invention include conventional volatile nonpolar solvents, such as chloroform, dichloromethane, benzene, toluene and ether and mixtures thereof with hydrophilic polar solvents, such as alcohols and water.

Various building-up methods including the LB process can be used for coating the surface of the substrate or the support with the monomolecular film on a water surface. The LB process which is a vertical dipping method is described in *J. Am. Chem. Soc.*, Vol. 57, page 1007 (1935); G. L. Gains, Jr., *Insoluble Monolayers at Liquid-Gas Interfaces*, (Interscience), N.Y. written by Kiyonari Fukuda (1986).

In addition thereto, other methods such as horizontal dipping method and rotating dipping method (e.g., described in JP-A-60-189929, JP-A-61-42394) can be used as coating methods. The built-up film can be obtained by carrying out repeatedly an operation of coating the substrate with the monomolecular film.

Improved horizontal dipping method described in Japanese Patent Application No. 63-54680 (corresponding to JP-A-1-228539) or continuous building-up method described in JP-A-60-209245 may be used for effectively carrying out building-up.

The present invention is now illustrated in greater detail by reference to the following examples which, however, are not to be construed as limiting the invention in any way.

EXAMPLE 1

Compound I-1 was used as the amphiphilic amino acid phenyl ester and dissolved in dichloromethane to a concentration of 1 mM, thus preparing a spreading solution. The solution was spread on the subphase of $10^{-3}$M phosphate buffer solution (pH 7.4) by using Langmuir's film balance to prepare a monomolecular film. Immediately after the preparation, the monomolecular film was compressed at a rate of 10 $cm^2$/min by means of belt drive barrier, and the surface pressure-molecule occupying area ($\pi$-A) characteristics at 20° C. of the monomolecular film were measured. There was obtained the result (curve A) of FIG. 1. It was seen from the $\pi$-A characteristics that a good monomolecular film was formed. The monomolecular film was left to stand on the subphase of the buffer solution under a given surface pressure of 15 dyne/cm at room temperature for about 2 hours to thereby allow polymerization to proceed. After standing, the $\pi$-A characteristics were again measured. There was obtained the result (curve B) of FIG. 1. It is clear from curves A and B that the molecule is densified by polymerization, the film is shrunk, the breaking strength is improved and hence the film is strengthened.

The polymerized film was compressed to 30 dyne/cm, and 40 layers thereof were built up on a gold-deposited glass substrate by means of horizontal dipping method. Fourier transduction infrared absorption spectrums of the built-up film were measured on the gold surface by reflection absorption method. It was found that absorption bands specific to the phenyl ester disappeared, absorption bands showing the formation of amide bonds appeared at 1650 to 1700 $cm^{-1}$ and hence a polypeptide was formed by polymerization. Further, the spectrums of a sample built up on a silicon substrate were measured by the permeation method and compared with the above spectrums. It was found that in the reflection method, absorption in C-H expansion of the long-chain alkyl group was remarkably lowered in comparison with absorption in C=O expansion of the amide. Hence, the axis of long-chain alkyl group was orientated in the direction perpendicular to the plane of the substrate. Accordingly, it could be confirmed that molecular arrangement was maintained.

EXAMPLE 2

Figure 2:
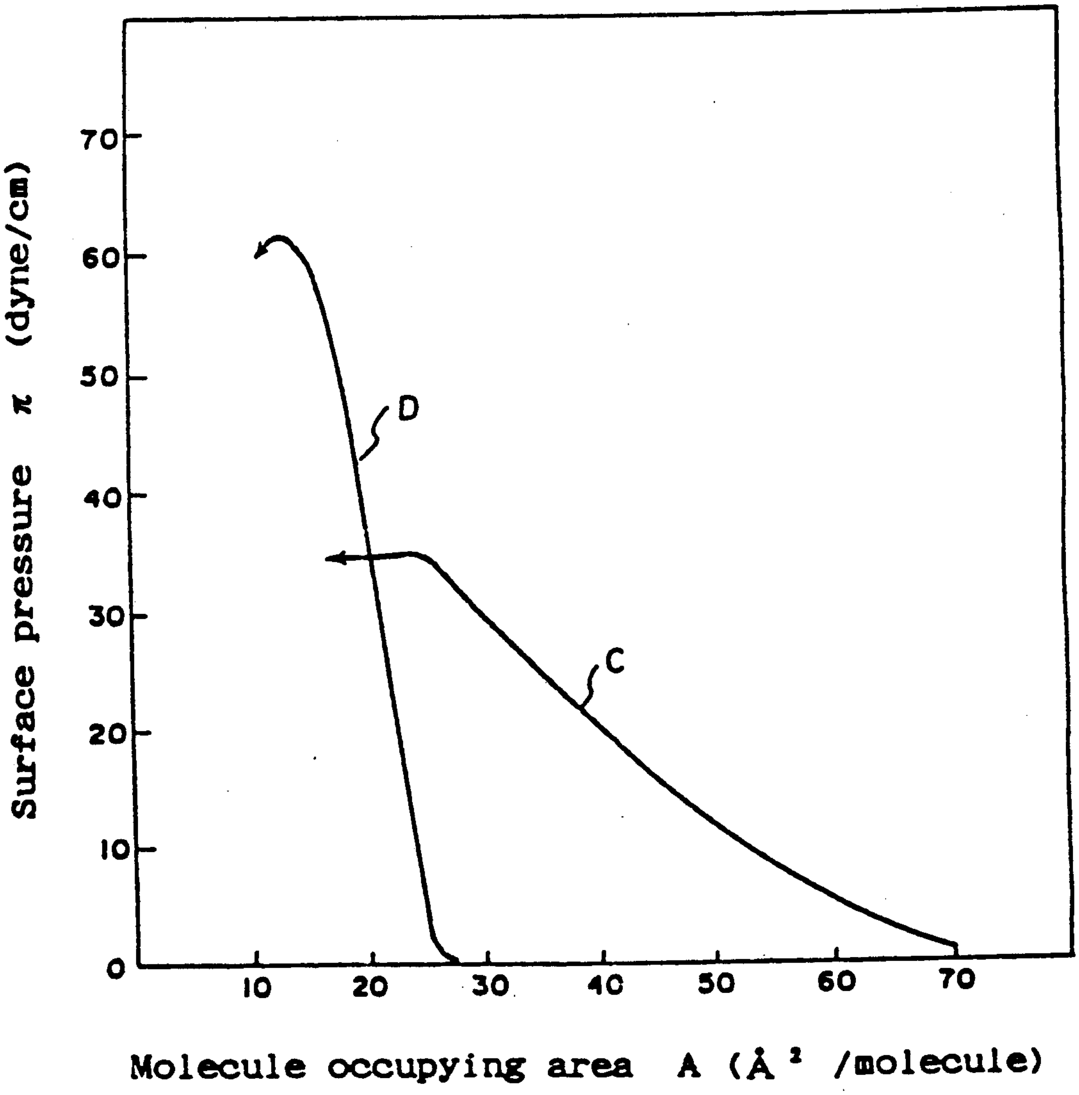
FIG. 2 is a graph illustrating the π-A isothermal characteristics at 20° C., wherein C is a curve for the monomolecular film of the monomer of compound I-3 and D is a curve for monomolecular film after polymerization at room temperature for 2 hours.

Compound I-3 was used as the amino acid phenyl ester and a spreading solution was prepared in the same way as in Example 1. The $\pi$-A characteristics at 20° C. were measured, and curve C of FIG. 2 was obtained for the monomer before polymerization. The monomolecular film was left to stand on a water surface having a pH of 7.4 at 35° C. under a constant surface pressure of 25 dyne/cm for about 80 minutes to thereby allow polymerization to proceed. After the polymerization, the $\pi$-A characteristics were again measured, and curve D of FIG. 2 was obtained. It is clear from curves C and D that the film is shrunk and strengthened.

After the lapse of various times from 1 to 60 minutes, about 40 layers of the monomolecular film were built up on a Si wafer substrate by the horizontal dipping method to measure polymerization rate. The infrared absorption spectrums of the built-up film were measured by the permeation method, and the rate of decrease in the characteristic absorption ($\sim$1750 $cm^{-1}$) of the phenyl ester was examined. It was found that about 50% of the ester disappeared after the reaction for 10 minutes, about 90% of the ester disappeared after the reaction for 60 minutes and amide bonds were formed.

COMPARATIVE EXAMPLE

For the purpose of comparison, the following amphiphilic amino acid methyl ester monomer was used. In the same way as in Example 1, a monomolecular film was formed on the water surface and polymerized.

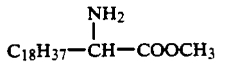

An aqueous buffer solution having a pH of 7.4 was used as subphase, and measurements were made at two points of 20° C. and 35° C. The $\pi$-A characteristics at 20° C. of the above monomer were similar to those of compound I-3, and the breaking pressure was about 35 dyne/cm. The monomolecular film was left to stand on the subphase at 20° C. and 35° C. under constant surface pressure of 15 dyne/cm for about 2 hours. However, change in the area of the film was scarcely caused.

In the same way as in Example 2, 40 layers of the film were built up on the Si wafer substrate. FT-IR spectrums were measured. In both cases of temperatures, the built-up film exhibited IR spectrums wherein the strong absorption ($\sim$1730 $cm^{-1}$) of the ester remained, and the amide bond was scarcely formed. Further, the monomolecular film was left to stand on a subphase having a pH of 9 under a surface pressure of 15 dyne/cm for about 20 hours, said pH value elevating the activity of the ester. Thereafter, the monomolecular film was built up in the same way as in the above-described operation. Absorption spectrums were measured. Weak broad absorption at 1600 to 1700 $cm^{-1}$ due to apparently the formation of amide bonds was observed. However, sharp absorption of the ester group was still left and the reaction was not completed. It was considered that the polymerization rate of the alkyl ester derivative was lower by a number of at least two figures than that of the aryl ester derivative of the present invention.

EXAMPLE 3

In the same way as in Example 1, 4 to 16 layers of the polymerized film of the compound used in Example 1 were built up on the surface of a glassy carbon electrode under 30 dyne/cm. The permeability was evaluated on the basis of electrochemical measurement.

Metal ion as an object to be permeated was chosen as substrate. The polymerized film-coated glassy carbon electrode was immersed in a neutral electrolytic solution consisting of 1 mM $K_3Fe(CN)_6$ and 10 mM $KNO_3$. The rate of $Fe^{3+}$ ion to be passed through the polymerized film was measured by means of cyclic voltammetry of oxidation-reduction current of $Fe^{3+}/Fe^{2+}$. The electrode potential was controlled against a saturated calomel electrode. Electrolysis was carried out under $N_2$ gas purge. The voltammogram was measured after potential was repeatedly scanned about 30 times. Voltammetry was carried out for the polymerized film of the present invention as well as the film built up on the electrode immediately after spreading the monomolecular film of the monomer before polymerization. Both were compared with each other.

Figure 3A:
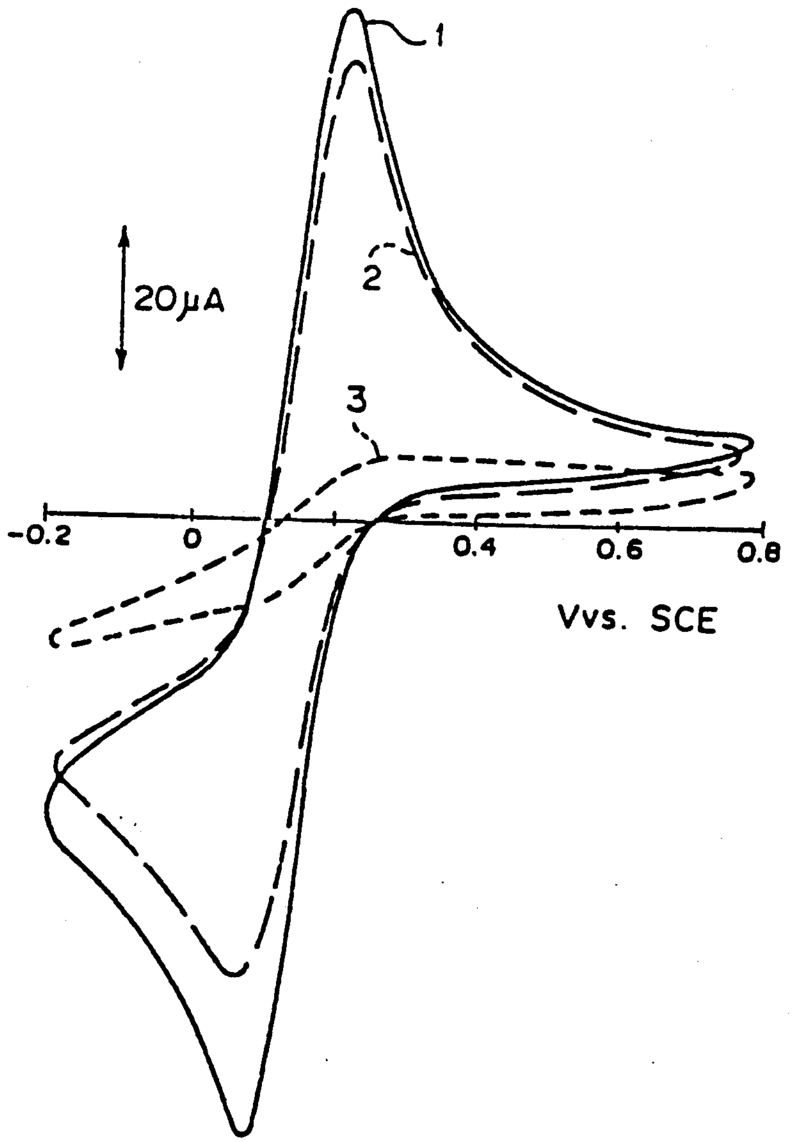
FIG. 3A is a Voltammograph of the built-up film of the monomer of compound I-1, wherein curve 1 is for the case where there is no film, curve 2 is for a film composed of 8 layers, and curve 3 is for a film composed of 16 layers.
Figure 3B:
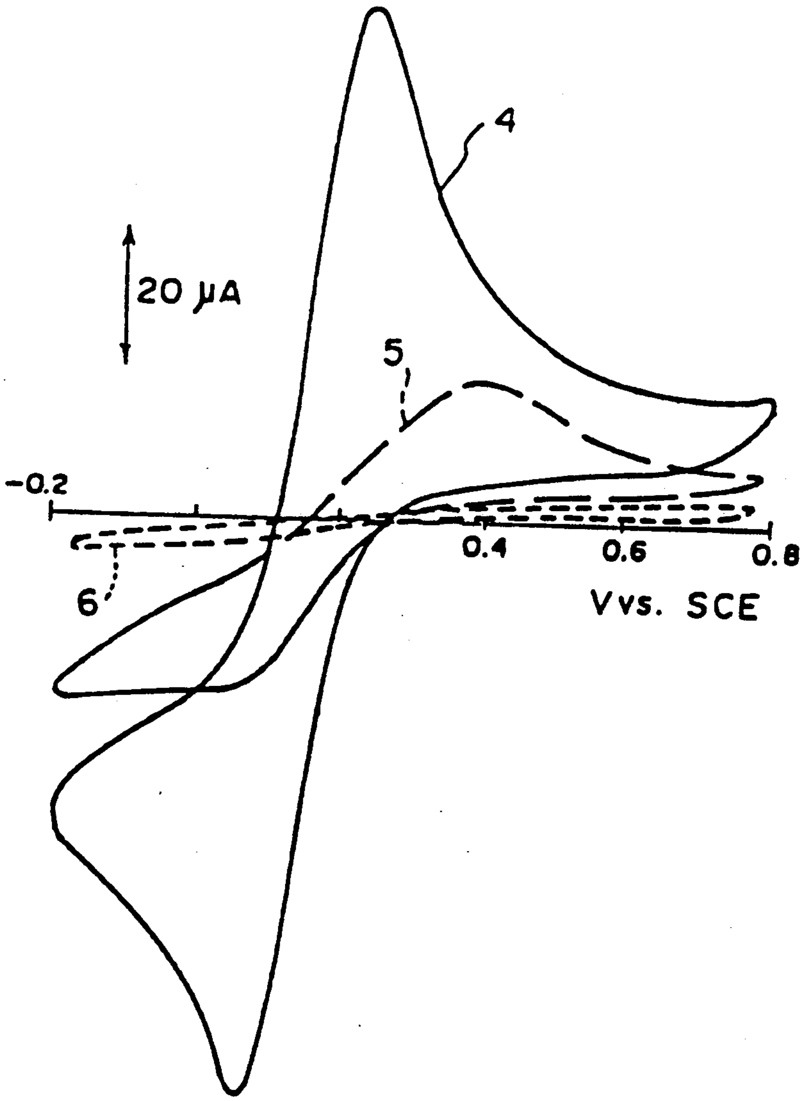
FIG. 3B is a Voltammograph of the polymerized built-up film of compound I-1, wherein curve 4 is for the case where there is no film (the same as 1), curve 5 is for a film composed of 4 layers, and curve 6 is for a film composed of 8 layers.

The results are shown in FIG. 3A and 3B.

In the built-up film of the monomer (FIG. 3A), the peak of current value (corresponding to the amount of $Fe^{3+}$ passed through the film), shown by the cyclic voltammogram, was beginning to cause markedly lowering in the peak value when the number of layers was about 8 (curve 2). When 16 layers were built up (curve 3), the value was lowered to about 1/7 of the peak. In the polymerized film, i.e., polypeptide film (FIG. 3B), the current value was lowered to about 1/5 by the building-up of 4 layers (curve 5) and reduced by about two orders by 8 layers (curve 6).

Thus, it is clear that a remarkable permeation-inhibiting effect can be obtained by polymerization. The voltammogram of the methyl ester of the Comparative Example was measured. The current value was lowered to only $\frac{1}{2}$ to $\frac{1}{3}$ by the building up of 8 layers. Therefore, the current-inhibiting effect was low.

EXAMPLE 4

Figure 5:
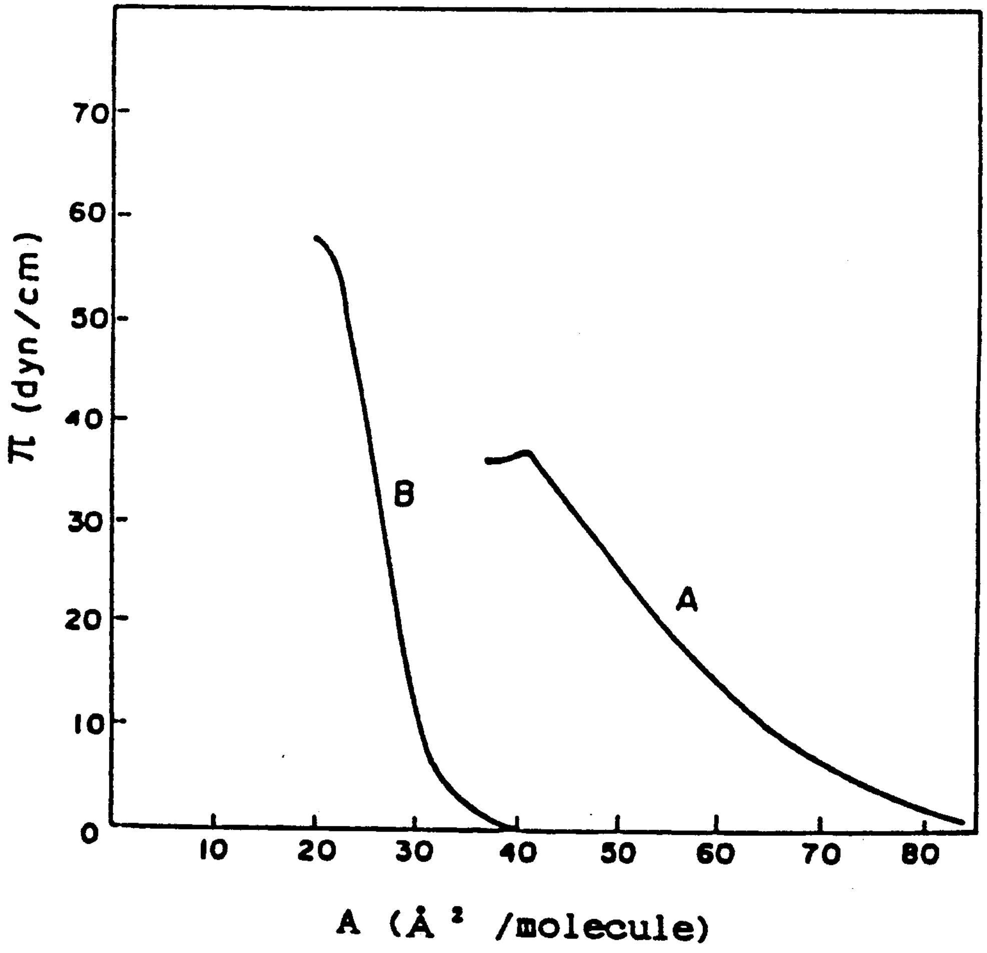
FIG. 5 is a graph showing the x-A characteristics at 20° C. of compound II-6, wherein A is a curve before polymerization and B is a curve after polymerization.

Compound II-6 was used as the amphiphilic amino acid phenyl ester. In the same way as in Example 1, a spreading solution was prepared, and the $\pi$-A characteristics at 20° C. were measured. The result (curve A) of FIG. 5 was obtained for the monomer before polymerization.

The monomolecular film was left to stand on an aqueous buffer solution (pH 7.4) under a constant surface pressure of 15 dyne/cm for about one hour to thereby allow the monomer to be polymerized. After the polymerization, the $\pi$-A characteristics were again measured. The result (curve B) of FIG. 5 was obtained. It is clear from curves A and B that the area of the film is shrunk to $\frac{1}{2}$ by polymerization, the molecule is densified and the breaking pressure is improved.

The monomolecular film after polymerization was built up on a silicon wafer substrate by the LB process, and FT-IR absorption spectrums of the built-up film were measured by the permeation method. It was found that the characteristic absorption ($\sim 1750\ cm^{-1}$) of the ester was lowered and the absorption ($\sim 1650\ cm^{-1}$) of amide bonds originating from the polypeptide appeared. Therefore, it could be confirmed that polymerization took place. It was estimated on the basis of the absorption intensity that reactivity after polymerization for about one hour was 80 to 90%.

To evaluate the orientation of the molecule after polymerization, the orientation of functional group was examined by comparing FT-IR absorption spectrums of the permeation method with those of the refection absorption measurement. It was confirmed that the polymerization molecule was orientated in such a manner that the axis of the long-chain alkyl group was orientated in the direction perpendicular to the plane of the film. Further, the film thickness of the built-up film formed on the silicon wafer substrate was measured by means of ellipsometry. The film thickness was 20±5 Å per one layer and it was suggested that the film was arranged with a thickness of nearly molecular length.

One layer of polymerized monomolecular film coated on the silicon wafer was observed by SEM to examine the morphology of the polymerized film. For the purpose of comparison, the following long-chain alkyl derivative of the optical inactive amino acid ester (a mixture of d-isomer and l-isomer) was polymerized on the water surface under the same conditions as those for compound II-6 so as to prepare a polymerized film which was then observed by SEM.

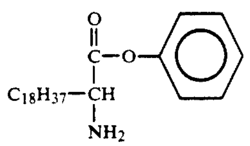

Figure 6A:
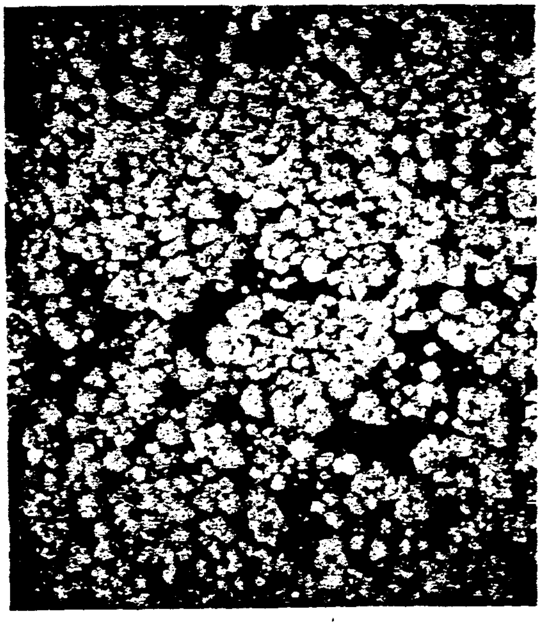
FIG. 6(*a*) is an electron micrograph (200 × magnification) of an LB film (monomolecular film) prepared by using the long-chain alkyl derivative of the optical inactive amino acid ester prepared in Example 4.
Figure 6B:
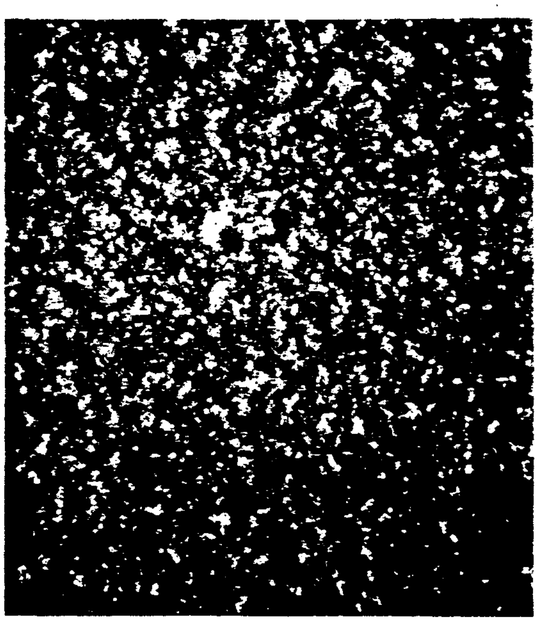

It was observed that the polymerized film [FIG. 6 (*b*)] prepared from the optical active amino acid ester of the present invention had a structure denser than that of the polymerized film [FIG. 6 (*a*)] prepared from the optical inactive amino acid ester.

The relative degree of polymerization of these polypeptide films was examined by using a fluorescent labeling method in combination with a ninhydrin reaction for the determination according to end-group analysis for the determination of primary amino group. The optical active polypeptide film of the present invention had a degree of polymerization which was at least 1.5 times that of the optical inactive polypeptide film.

While the invention has been described in detail and with reference to specific embodiments thereof, it will be apparent to one skilled in the art that various changes and modifications can be made therein without departing from the spirit and scope of the present invention.

What is claimed is:

1. A polypeptide thin film obtained by spontaneous polymerization of a film comprising an amphiphilic amino acid derivative monomer represent by formula (I):

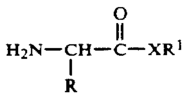

(I)

wherein R represents an organic group; $XR^1$ is an elimination group whose conjugated acid has a pKa of not higher than 14; X represents —O—, —S—, or —N($R^2$)—; $R^1$ represents an aryl group; and $R^2$ represents a hydrogen atom, an alkyl group or an aryl group, or $R^1$ and $R^2$ are combined together to form a carbocylic or heterocyclic ring.

2. A polypeptide thin film obtained by spontaneous polymerization of a film comprising an optically active amphiphilic amino acid derivative monomer represented by formula (II):

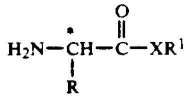

(II)

wherein R represents an organic group; $XR^1$ is an elimination group whose conjugated acid has a pKa of not higher than 14; X represents —O—, —S—, or —N($R^2$)—; $R^1$ represents an aryl group; and $R^2$ represents a hydrogen atom, an alkyl group or an aryl group, or $R^1$ and $R^2$ are combined together to form a carbocyclic or heterocyclic ring.

3. A polypeptide thin film as claimed in claim 1, wherein R represents a long chain alkyl group.

4. A polypeptide thin film as claimed in claim 3, wherein R represents a straight-chain alkyl group having from 12 to 20 carbon atoms.

5. A polypeptide thin film as claimed in claim 4, wherein R represents a straight-chain alkyl group having from 16 to 20 carbon atoms.

6. A polypeptide thin film as claimed in claim 1, herein $R^1$ is an aryl group, a halo alkyl group, an alkenyl or an alkinyl group, an acylamino group, or —N=$CR^3(R^4)$, wherein $R^3$ and $R^4$ are each hydrogen, an alkyl group, an aryl group, a substituted alkyl group, or a substituted aryl group.

7. A polypeptide thin film as claimed in claim 2, wherein R represents a long chain alkyl group.

8. A polypeptide thin film as claimed in claim 7, wherein R represents a straight-chain alkyl group having from 12 to 20 carbon atoms.

9. A polypeptide thin film as claimed in claim 8, wherein R represents a straight-chain alkyl group having from 16 to 20 carbon atoms.

10. A polypeptide thin film as claimed in claim 2, wherein $R^1$ is an aryl group, a halo alkyl group, an alkenyl group, an alkinyl group, an acylamino group, or —N=$CR^3(R^4)$, an alkenyl, wherein $R^3$ and $R^4$ are each hydrogen, an alkyl group, an aryl group, a substituted alkyl group, or a substituted aryl group.

* * * * *